United States Patent
Smith et al.

(10) Patent No.: US 9,464,648 B1
(45) Date of Patent: Oct. 11, 2016

(54) DEVICE FOR SECURING CURTAIN ENDS TO WALLS

(71) Applicants: Arlene R. Smith, Julian, CA (US); John C. Heglin, Julian, CA (US)

(72) Inventors: Arlene R. Smith, Julian, CA (US); John C. Heglin, Julian, CA (US)

( * ) Notice: Subject to any disclaimer, the term of this patent is extended or adjusted under 35 U.S.C. 154(b) by 0 days.

(21) Appl. No.: 14/283,488

(22) Filed: May 21, 2014

Related U.S. Application Data

(60) Provisional application No. 61/838,704, filed on Jun. 24, 2013.

(51) Int. Cl.
*F16B 2/22* (2006.01)
*A47H 19/00* (2006.01)

(52) U.S. Cl.
CPC .................. *F16B 2/22* (2013.01); *A47H 19/00* (2013.01)

(58) Field of Classification Search
CPC ...................................................... A47H 19/00
USPC .................................. 160/349.2, 349.1, 330
See application file for complete search history.

(56) References Cited

U.S. PATENT DOCUMENTS

| | | | | |
|---|---|---|---|---|
| 2,107,885 A * | 2/1938 | Caggiano | | 248/223.41 |
| 2,242,478 A * | 5/1941 | Pekarz | | 24/457 |
| 2,303,502 A * | 12/1942 | Rous | | A47K 3/38 |
| | | | | 160/327 |
| 2,521,885 A * | 9/1950 | Vasquez | | 292/251.5 |
| 2,584,224 A * | 2/1952 | Pfaffko | | 160/349.2 |
| 2,817,400 A * | 12/1957 | Cavage | | 160/349.2 |
| 5,003,647 A * | 4/1991 | Williams | | 4/559 |
| 5,125,134 A * | 6/1992 | Morita | | 24/303 |
| 5,465,776 A * | 11/1995 | Mirza | | B60J 1/2011 |
| | | | | 160/368.1 |
| 5,517,722 A * | 5/1996 | Bender | | 16/87.2 |
| 6,296,042 B1 * | 10/2001 | Hung | | 160/349.2 |
| 7,024,706 B2 * | 4/2006 | Hess | | 4/557 |
| 2005/0284590 A1 * | 12/2005 | Mariconti et al. | | 160/349.1 |
| 2009/0294077 A1 * | 12/2009 | Zimmer | | 160/168.1 R |
| 2011/0011994 A1 * | 1/2011 | Ahlstrom | | 248/205.4 |
| 2011/0073727 A1 * | 3/2011 | Koziak | | 248/205.1 |
| 2013/0291366 A1 * | 11/2013 | Hoffman | | 29/525.02 |
| 2015/0114579 A1 * | 4/2015 | Baines | | 160/330 |

* cited by examiner

*Primary Examiner* — Katherine Mitchell
*Assistant Examiner* — Scott Denion
(74) *Attorney, Agent, or Firm* — Donald J. Ersler

(57) ABSTRACT

A device for securing curtain ends to walls preferably includes a curtain retention device and a magnet. The curtain retention device could be a curtain retention clip or a butterfly clutch pin. The curtain retention clip includes a spring-loaded clip and a decorative fascia. Alternatively, a clip magnet may be secured to a rear of the spring-loaded clip and used with a wall mounted ferrous wall plate. The butterfly clutch pin includes a decorative tack pin and a butterfly retention clutch. The magnet may be attached to a wall with any suitable method. If the curtain retention clip is used, the spring-loaded clip is secured to the curtain and the spring-loaded clip is secured to the magnet. If the butterfly clutch pin is used, a pin portion of the decorative tack pin is inserted through the curtain and into the butterfly retention clutch.

4 Claims, 5 Drawing Sheets

DEVICE FOR SECURING CURTAIN ENDS TO WALLS

CROSS-REFERENCES TO RELATED APPLICATIONS

This is a utility patent application taking priority from provisional application No. 61/838,704 filed on Jun. 24, 2013.

BACKGROUND OF THE INVENTION

1. Field of the Invention

The present invention relates generally to window treatments and more specifically to a device for securing curtains ends to walls, which reduces energy costs; blocks unwanted light; and enhances privacy.

2. Discussion of the Prior Art

Conventional curtains do not rest flush against a wall, creating a draft and allowing undesirable hot or cold air to enter or escape a building. This can lead to higher energy costs and an increased consumption of natural resources. Additionally, unwanted light can shine into rooms through gaps between the curtain and the wall, making it difficult to sleep. If the gap is significant, it may also compromise privacy.

Accordingly, there is a clearly felt need in the art for a device for securing curtains ends to walls, which reduces energy costs from leaky windows; blocks unwanted light during night and day; and prevents peeking into a room through a window.

SUMMARY OF THE INVENTION

The present invention provides a device for securing curtain ends to walls, which reduces energy costs; blocks unwanted light; and enhances privacy. The device for securing curtain ends to walls (curtain end-securing device) preferably includes a curtain retention device and a magnet. The curtain retention device could be a curtain retention clip or a butterfly clutch pin. The curtain retention clip includes a spring-loaded clip and a decorative fascia. The spring-loaded clip must be fabricated from a ferrous material. Alternatively, a clip magnet may be secured to a rear of the spring-loaded clip and a decorative ferrous wall plate attached to a wall, adjacent the clip magnet position. The butterfly clutch pin includes a decorative tack pin and a butterfly retention clutch. A pin portion extends from a rear of the decorative tack pin. The butterfly retention clutch includes a pin receiver and a pair of release tabs. The butterfly retention clutch must be fabricated from a ferrous material. The magnet includes a magnet fastener hole, if a threaded fastener or nail is used for retaining the magnet against the wall. The magnet is attached to a wall with a threaded fastener; a nail; a hook and loop fastener, adhesive double-sided tape or any other suitable attachment method. The fastener would be used in conjunction with a drywall anchor for drywall. A wall anchor for wood or other dense materials is not needed.

The magnet is secured to a wall in the area where it is desired for the curtain to be in contact with a wall. If a threaded fastener is used to secure the magnet to the drywall, a hole is drilled in the wall for the drywall anchor. The drywall anchor is then pounded into the wall. The threaded fastener is inserted through the magnet fastener hole and threaded into the drywall anchor or directly into wood or other dense materials.

If the curtain retention clip is used, the spring-loaded clip is secured to the curtain and the spring-loaded clip is brought in contact with the magnet. If the butterfly clutch pin is used, the pin portion of the decorative tack pin is inserted through the curtain and the pair of release tabs are depressed to receive the pin portion. A rear of the butterfly retention clutch is brought in contact with the magnet.

Accordingly, it is an object of the present invention to provide a curtain end-securing device, which reduces energy costs from leaky windows.

It is another object of the present invention to provide a curtain end-securing device, which blocks unwanted light during night and day.

Finally, it is another object of the present invention to provide a curtain end-securing device, which prevents peeking into a room through a window.

These and additional objects, advantages, features and benefits of the present invention will become apparent from the following specification.

DETAILED DESCRIPTION OF THE PREFERRED EMBODIMENTS

Figure 1:
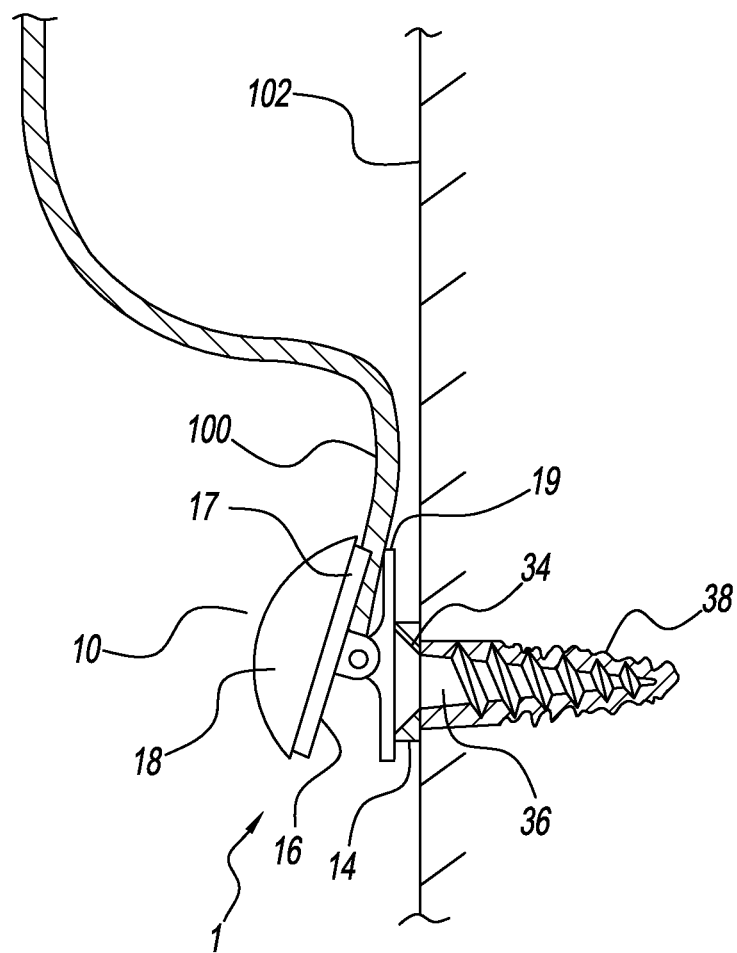
FIG. 1 is a top cross sectional view of a curtain end-securing device retaining a curtain end and secured to drywall in accordance with the present invention.
Figure 3:
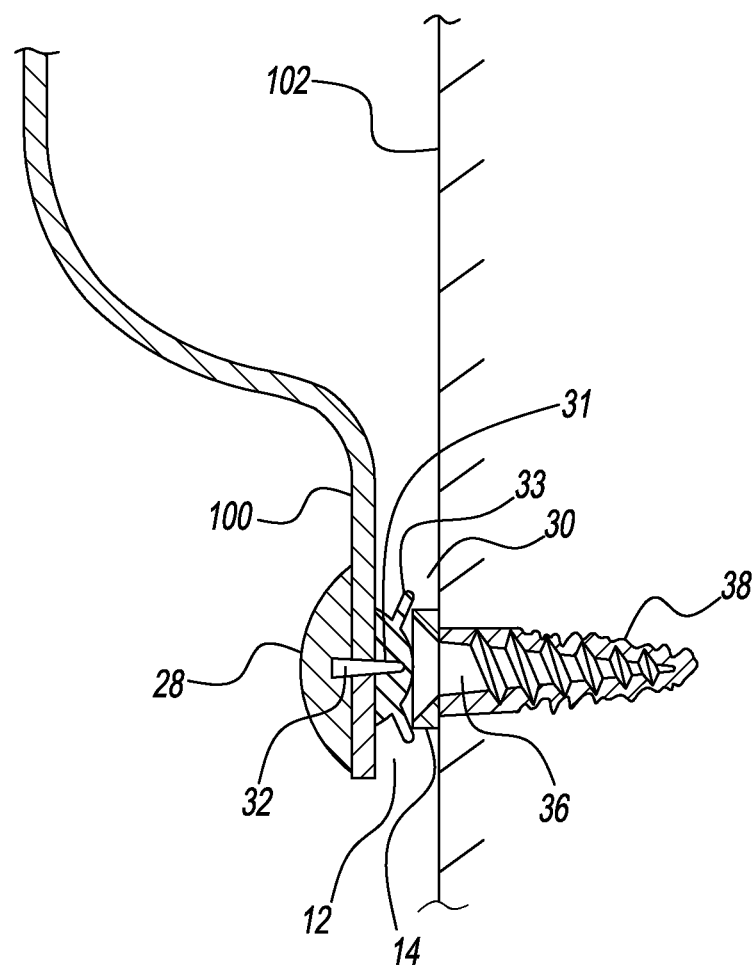
FIG. 3 is a top cross sectional view of a curtain end-securing device with a butterfly clutch pin retaining a curtain end and secured to drywall in accordance with the present invention.
Figure 4:
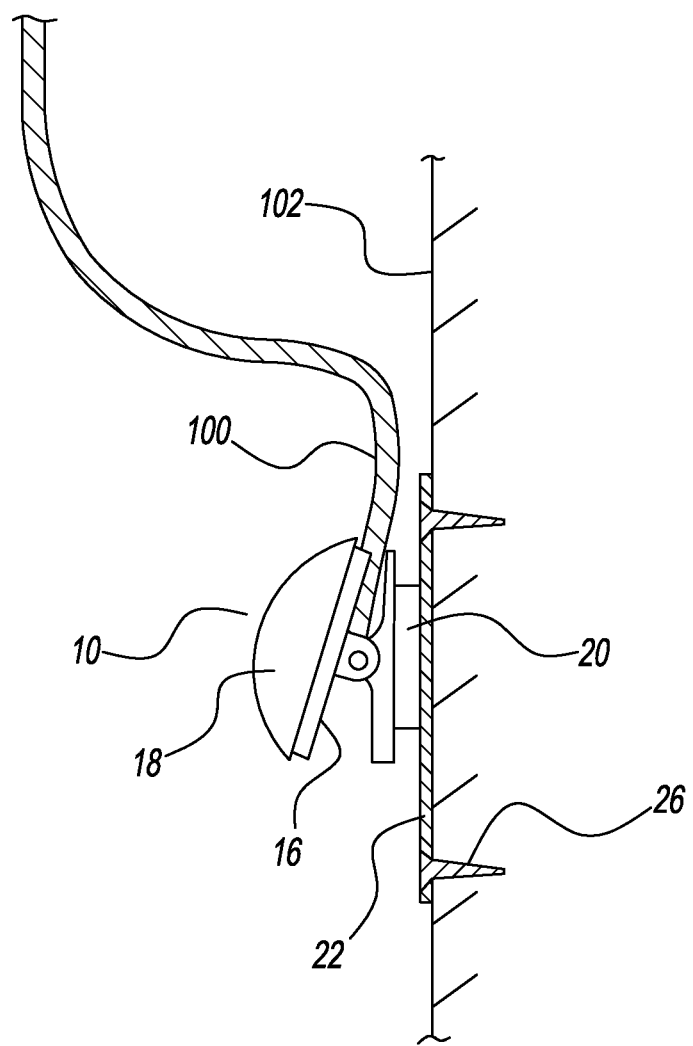
FIG. 4 is a top cross sectional view of a curtain end-securing device with a magnet attached to a spring-loaded clip and a decorative ferrous plate retaining a curtain end in accordance with the present invention.
Figure 5:
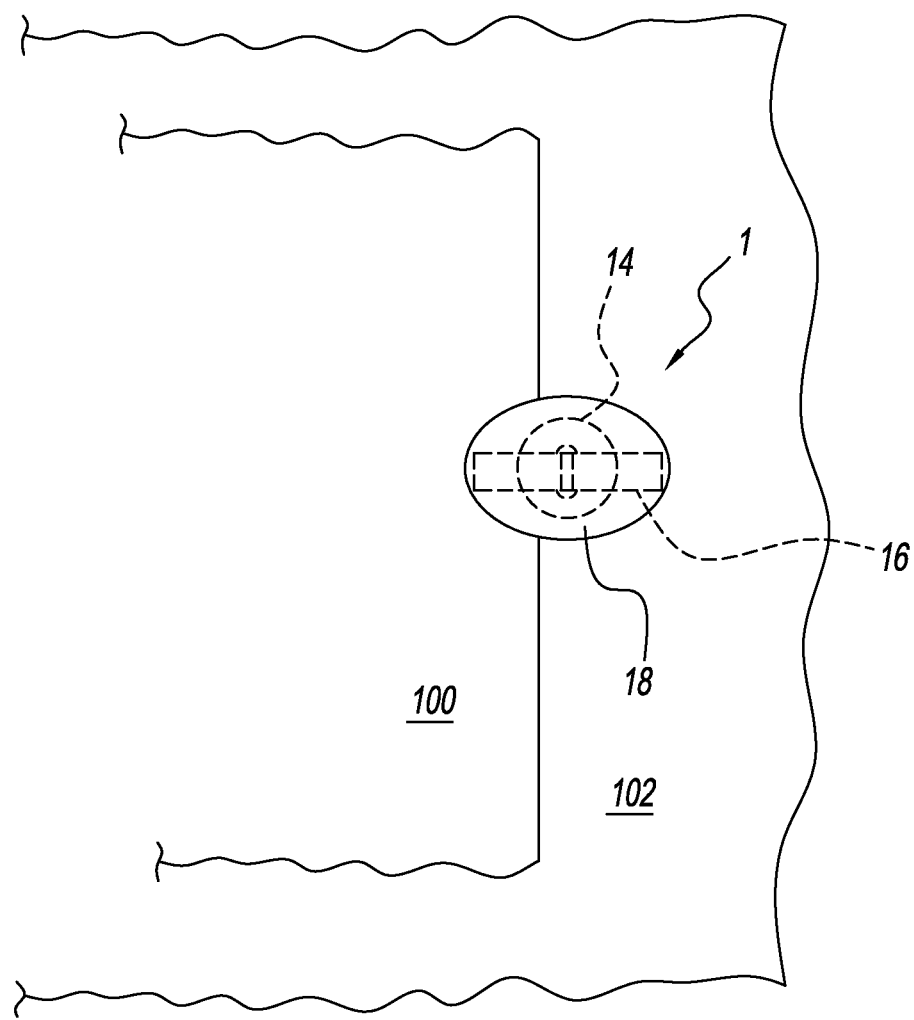
FIG. 5 is a front view of a curtain end-securing device retaining a curtain end and secured to drywall, wood or a dense material in accordance with the present invention.

With reference now to the drawings, and particularly to FIG. 1, there is shown a top cross sectional view of a curtain end-securing device 1 retaining a curtain end 100 and secured to drywall 102. With reference to FIG. 5, the curtain end-securing device 1 preferably includes a curtain retention device and a magnet 14. With reference to FIG. 3, the curtain retention device could be a curtain retention clip 10 or a butterfly clutch pin 12. The curtain retention clip 10 includes a spring-loaded clip 16 and a decorative fascia 18. The spring-loaded clip 16 includes a first leg 17, a second leg 19 and a spring (not shown). One end of the first leg 17 is biased toward one end of the second leg 19 with the spring. The second leg 19 must be fabricated from a ferrous material, so it can be attracted to the magnet 14. With reference to FIG. 4, a clip magnet 20 may be secured to the second leg 19 and a decorative ferrous wall plate 22 attached to the drywall 102, adjacent the clip magnet 18 position. The decorative ferrous wall plate 22 may be attached to the drywall 102 with fasteners 26 or any other suitable attachment method.

With reference to FIG. 3, the butterfly clutch pin 12 includes a decorative tack pin 28 and a butterfly retention clutch 30. A pin portion 32 extends from a rear of the decorative tack pin 22. The butterfly retention clutch 30 includes a pin receiver 31 and a pair of release tabs 33. The pair of release tabs 33 are pulled to receive and retain the pin portion 32 in the pin receiver 31. The butterfly retention clutch 30 must be fabricated from a ferrous material. Butterfly clutch pins are well known in the art and need not be explained in further detail.

Figure 2:
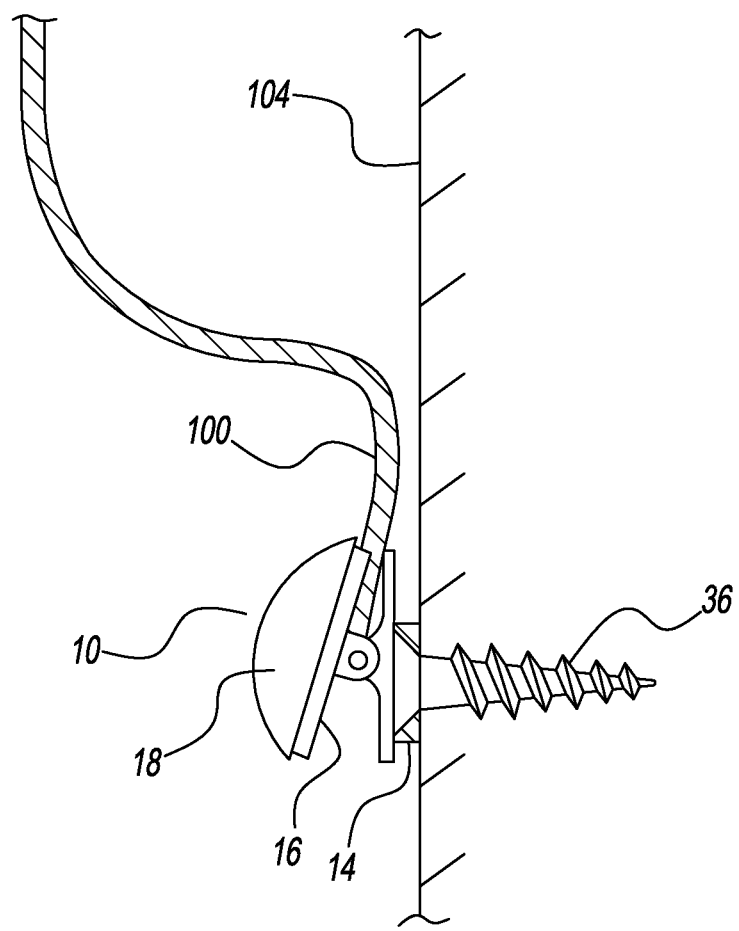
FIG. 2 is a top cross sectional view of a curtain end-securing device retaining a curtain end and secured to wood or a dense material in accordance with the present invention.

The magnet 14 includes a magnet fastener hole 34, if a threaded fastener 36 or nail is used for retaining the magnet against the drywall 102. The magnet 14 is attached to the wall with a threaded fastener; a nail; a hook and loop fastener, adhesive double-sided tape or any other suitable attachment method. The fastener 36 would be used in conjunction with a drywall anchor 38 for the drywall 102. With reference to FIG. 2, a wall anchor for wood 104 or other dense materials is not needed. The magnet 14 is secured to the drywall 102 or wood 104 in the area where it is desired for the curtain end 100 to be in contact with the drywall 102. If a threaded fastener is used to secure the magnet 14 to the drywall 102, a hole is drilled in the drywall 102 for the drywall anchor 38. The drywall anchor 38 is then pounded into the drywall 102. The threaded fastener 36 is inserted through the magnet fastener hole 34 and threaded into the drywall anchor 38 or directly into wood 104 or other dense materials.

If the curtain retention clip 10 is used, the spring-loaded clip 16 is secured to the curtain end 100 and the second leg is brought in contact with the magnet 14. If the butterfly clutch pin 12 is used, the pin portion 32 of the decorative tack pin 28 is inserted through the curtain end 100 and the butterfly retention clutch 30 is depressed to receive the pin portion 32. A rear of the butterfly retention clutch 30 is brought in contact with the magnet 14.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A curtain end-securing device comprising:
   an ornamental tack pin includes a pin portion extending from a rear thereof;
   a butterfly retention clutch includes a pin receiver and a pair of release tabs, said pair of release tabs are fabricated from a ferrous material; and
   a magnet is secured to a wall, wherein said pin portion is inserted through a curtain end, said ornamental tack pin is positioned outward from the curtain end, said pair of release tabs are pulled to receive and retain said pin portion in said pin receiver, said pair of release tabs are magnetically retained against said magnet.

2. The curtain end-securing device of claim 1 wherein:
   a hole is formed through in said magnet to receive a fastener.

3. The curtain end-securing device of claim 2 wherein:
   a drywall anchor is inserted into the wall, said fastener is threaded into said drywall anchor.

4. The curtain end-securing device of claim 1 wherein:
   a countersunk hole is formed through said magnet to receive a fastener, a head of said fastener is substantially flush with said magnet, said pair of release tabs are magnetically retained by said magnet.

* * * * *